(12) United States Patent
Strong (10) Patent No.: US 8,561,567 B2
(45) Date of Patent: Oct. 22, 2013

(54) FOOD STORAGE AND MANAGEMENT SYSTEM

(76) Inventor: Tara Strong, Toluca Lake, CA (US)

( * ) Notice: Subject to any disclaimer, the term of this patent is extended or adjusted under 35 U.S.C. 154(b) by 0 days.

(21) Appl. No.: 13/209,553

(22) Filed: Aug. 15, 2011

(65) Prior Publication Data

US 2012/0111823 A1    May 10, 2012

Related U.S. Application Data (63) Continuation of application No. 11/772,304, filed on Jul. 2, 2007, now Pat. No. 8,020,507, which is a continuation of application No. 11/408,580, filed on Apr. 21, 2006, now abandoned.

(51) Int. Cl.
*G09F 9/00* (2006.01)

(52) U.S. Cl.
USPC ............................ 116/308; 116/309; 215/11.1

(58) Field of Classification Search
USPC ............ 116/306–308, 327, 298–299, DIG. 1; 283/62, 72, 74, 117, 900; 40/310–311, 40/113, 111; 222/29; 215/11.1, 206, 230
See application file for complete search history.

(56) References Cited

U.S. PATENT DOCUMENTS

| | | | |
|---|---|---|---|
| 153,529 A * | 7/1874 | Bennett | ........................ 215/230 |
| 261,131 A | 7/1882 | Bonshire | |
| 572,160 A | 12/1896 | Graham | |
| 652,288 A | 6/1900 | Phelps | |
| 841,668 A | 1/1907 | Cowles | |
| 1,687,956 A | 10/1928 | Trask | |
| 1,711,711 A | 5/1929 | Woolley | |
| 1,755,696 A | 4/1930 | Kluge et al. | |
| 2,013,616 A | 9/1935 | Rettenmeyer | |
| 2,024,889 A | 12/1935 | Simeone | |
| 2,111,637 A | 3/1938 | Mehaffey | |
| 2,150,835 A | 3/1939 | Kazimirow | |
| 2,193,851 A | 3/1940 | Arden | |
| D144,685 S | 5/1946 | Bouhall | |
| 2,434,611 A | 1/1948 | Hamiel | |
| 2,450,949 A | 10/1948 | Gattuccio et al. | |
| 2,538,684 A | 1/1951 | Gushard et al. | |
| 2,648,226 A | 8/1953 | Finch | |
| 2,678,621 A | 5/1954 | Proctor, Jr. | |
| 2,731,166 A | 1/1956 | Raphael | |
| 2,825,208 A * | 3/1958 | Anderson | ..................... 190/109 |
| 2,921,553 A | 1/1960 | Luenberger | |
| 3,059,801 A | 10/1962 | Dragon | |
| 3,073,468 A | 1/1963 | Arneson | |
| 3,139,064 A | 6/1964 | Harle | |
| 3,405,828 A | 10/1968 | St. Pierre | |

(Continued)

FOREIGN PATENT DOCUMENTS

| WO | WO-2006/008477 | 1/2006 |
|---|---|---|
| WO | PCT/US2008/068881 | 7/2008 |
| WO | WO 2009/006459 | 1/2009 |

*Primary Examiner* — Peter J. Macchiarolo
*Assistant Examiner* — Tania Courson
(74) *Attorney, Agent, or Firm* — Novel IP (57) ABSTRACT

The present invention is directed toward a food storage container comprising a body with a mechanism for denoting a time in which a food item was placed in the storage container for storage. In one embodiment, the time designation mechanism comprises a plurality of rings where each ring comprises at least one marker. Time is denoted by aligning the marker with a label located proximate to said ring.

18 Claims, 9 Drawing Sheets

(56) References Cited

U.S. PATENT DOCUMENTS

| | | | |
|---|---|---|---|
| 3,424,336 A * | 1/1969 | Bult et al. ............... 220/780 |
| 3,445,021 A | 5/1969 | Johnson |
| 3,446,179 A | 5/1969 | Bender |
| 3,460,508 A * | 8/1969 | Baxter .................. 116/317 |
| 3,574,957 A * | 4/1971 | Bello-Bridick ........... 434/173 |
| 3,684,117 A | 8/1972 | Leopold et al. |
| 3,753,417 A | 8/1973 | Garby |
| 3,818,858 A | 6/1974 | Kramer et al. |
| 3,828,519 A | 8/1974 | Levey |
| 4,041,628 A | 8/1977 | Sasson |
| 4,220,247 A * | 9/1980 | Kramer .................. 215/219 |
| 4,548,157 A | 10/1985 | Hevoyan |
| 4,759,139 A | 7/1988 | Ricks |
| 4,860,684 A | 8/1989 | Al-Harbi |
| 5,082,129 A | 1/1992 | Kramer |
| 5,269,085 A | 12/1993 | Chiapetta et al. |
| 5,284,262 A * | 2/1994 | O'Nan .................... 215/206 |
| 5,377,614 A | 1/1995 | Glazer |
| 5,433,324 A | 7/1995 | Leonard |
| 5,662,224 A | 9/1997 | Nogues |
| 5,682,931 A | 11/1997 | Mouchmouchian |
| 5,807,156 A * | 9/1998 | Owen ..................... 446/77 |
| 5,839,581 A | 11/1998 | Vagedes |
| 5,845,777 A * | 12/1998 | Najmi .................... 206/459.1 |
| 6,000,159 A | 12/1999 | Hornung |
| 6,036,019 A | 3/2000 | Silverman |
| 6,059,133 A | 5/2000 | Lai |
| 6,068,149 A | 5/2000 | Telega |
| 6,089,180 A | 7/2000 | Nichols, Jr. |
| 6,116,439 A | 9/2000 | Yaniv |
| 6,138,848 A | 10/2000 | Fermo |
| 6,213,304 B1 * | 4/2001 | Juliussen ............... 206/581 |
| 6,551,639 B1 | 4/2003 | Nye et al. |
| 6,571,564 B2 | 6/2003 | Upadhye et al. |
| 6,575,202 B2 | 6/2003 | LaFond |
| 6,616,000 B1 | 9/2003 | Renz |
| 6,622,856 B2 * | 9/2003 | Gallo et al. ............. 206/232 |
| D481,946 S * | 11/2003 | Nicholson et al. ......... D9/436 |
| D490,707 S | 6/2004 | Mataya |
| 6,779,480 B2 | 8/2004 | Zamjahn |
| 6,805,072 B1 | 10/2004 | DeSano |
| 7,032,535 B2 | 4/2006 | Halstead et al. |
| 7,222,736 B1 * | 5/2007 | Seijas .................... 206/534 |
| 7,549,548 B2 * | 6/2009 | Kraus et al. ............. 215/396 |
| 7,878,350 B2 | 2/2011 | Ramoundos |
| 8,047,375 B1 * | 11/2011 | Hartsfield ............... 206/581 |
| 8,371,464 B2 * | 2/2013 | Rachuk et al. ............ 215/230 |
| 2002/0129758 A1 | 9/2002 | Hanley et al. |
| 2003/0192468 A1 | 10/2003 | Goertzen |
| 2004/0026351 A1 | 2/2004 | Dunn et al. |
| 2006/0213856 A1 * | 9/2006 | Kraus et al. ............. 215/11.1 |
| 2006/0213858 A1 | 9/2006 | Kraus et al. |
| 2007/0056503 A1 | 3/2007 | Sollaccio |
| 2008/0105328 A1 | 5/2008 | Desmond |
| 2008/0190354 A1 | 8/2008 | Malpas et al. |
| 2009/0120898 A1 * | 5/2009 | Hunt et al. ............. 215/230 |
| 2009/0178940 A1 * | 7/2009 | Said ..................... 206/221 |
| 2009/0277374 A1 | 11/2009 | Schie et al. |
| 2011/0049082 A1 | 3/2011 | Wu |

* cited by examiner

FOOD STORAGE AND MANAGEMENT SYSTEM

CROSS REFERENCE

The present application is a continuation of U.S. patent application Ser. No. 11/772,304, filed on Jul. 2, 2007 now U.S. Pat. No. 8,020,507, which is a continuation-in-part of U.S. patent application Ser. No. 11/408,580, filed on Apr. 21, 2006, now abandoned, and entitled "Milk Storage and Management System", which is hereby incorporated by reference.

FIELD OF THE INVENTION

The present specification relates generally to food storage systems. More particularly, the present specification relates to a system and kit for the storage and management of breast milk. In addition, the present specification relates to a system and kit for the storage and management of food items.

BACKGROUND OF THE INVENTION

The benefits of breast feeding for healthy growth of infants are well known. Various medical studies attribute breast feeding with enhanced physical and cognitive development for newborns and with the increased ability to fight infections and illnesses.

However, with the increasingly hectic pace of life, mothers of infants, especially those who are working, find it difficult to breast feed their children at regular and frequent intervals. This problem is compounded when women have to travel.

Various types of breast pumps and storage containers are presently available that allow a mother to extract her milk and keep it for storage. The stored milk can then be fed to the infant by a care giver or any other person who takes care of the baby in the absence of the mother. It is essential, however, for the stored milk to be properly stored and fed to an infant within a specific period of time after the milk was first extracted from a woman.

When large quantities of milk are stored in advance, there is a possibility that some of the stored milk may not be fed to the infant, and it remains unused in the refrigerator for several days. In such a scenario, in the absence of any reliable source of information regarding the date the milk was expressed, a care giver may not know if the milk stored is fresh or leftover. Further, the care giver may also erroneously feed the baby with stale milk, which may endanger the baby's health with problems such as indigestion or food poisoning.

One solution to this problem is that mothers may mark milk containers by writing on them or pasting on labels with date information. However, manual labeling of the containers every time the milk is expressed is time consuming, inconvenient, and difficult to do on a repeated basis. Since breast feeding is a long term activity that continues for at least several months, therefore, there is a need for methods and systems for management of breast milk storage, which enable providing the necessary information regarding the date of storage and are easy to use. There is also a need to provide nursing mothers with a convenient kit that includes such storage systems with educational information.

Further, it would be desirable to similarly mark containers that are used for storing food to eliminate food waste and potential health issues with respect to expired or spoiled food. In addition, some care givers may choose to cook and/or process their own baby food, including fruit and vegetable products. Thus, there is a need for providing methods and systems for the similar management of food storage, which enable providing the necessary information regarding the date of storage and are easy to use.

Additionally, it would be desirable to similarly mark containers that are used for storing other perishable items to eliminate potential health issues. For example, certain cosmetic items have a limited viable shelf life; some preparations or herbal remedies may be made by the consumer and subsequently stored for later use. Thus, there is a need for providing methods and systems for the similar management of the storage of perishable items, which enable providing the necessary information regarding the date of storage and are easy to use.

SUMMARY OF THE INVENTION

The present specification is directed toward a milk storage container comprising a plastic body with a mechanism for denoting a time in which milk was placed in the storage container for storage. In one embodiment, the time is denoted by a day, a month, or an hour. In another embodiment, the time designation mechanism comprises a plurality of rings wherein at least one ring comprises at least one marker. Time may be further denoted by aligning said marker with a label located proximate to said ring. The label denotes at least one of a day, hour, or month.

In another embodiment, the milk storage container comprises a plastic body and a lid wherein said lid further comprises a mechanism for denoting a time in which milk was placed in the storage container for storage. In one embodiment, the time is denoted by a day, a month, or an hour. In another embodiment, the time designation mechanism comprises a plurality of rings wherein at least one ring comprises at least one marker. Time may be further denoted by aligning said marker with a label located proximate to said ring. The label denotes at least one of a day, hour, or month.

In another embodiment, the present specification is directed toward a food and/or perishable item storage container comprising a plastic body with a mechanism for denoting a time in which the food and/or other item perishable was placed in the storage container for storage. In one embodiment, the time is denoted by a day, a month, or an hour. In another embodiment, the time designation mechanism comprises a plurality of rings wherein at least one ring comprises at least one marker. Time may be further denoted by aligning said marker with a label located proximate to said ring. The label denotes at least one of a day, hour, or month.

In another embodiment, the food and/or perishable item storage container comprises a plastic bottle with a time denoting mechanism having two rotating members, wherein a first rotating member comprises markings denoting a day of a month and a second rotating member comprises markings denoting a month of a year. Optionally, the mechanism is integrated into a lid. Optionally, at least one member is elliptically shaped. Optionally, the container further comprises a cap and an indented transparent portion to provide a viewing window for viewing a denoted time.

In another embodiment, the food and/or perishable item storage container comprises a plastic bottle with a time denoting mechanism having two rotating members, wherein a first rotating member comprises markings denoting a day of a week and a second rotating member comprises markings denoting an hour of a day. Optionally, the mechanism is integrated into a lid. Optionally, at least one member is elliptically shaped. Optionally, the container further comprises a cap and an indented transparent portion to provide a viewing window for viewing a denoted time.

In another embodiment, the present specification is directed to a lid adaptable to cover a mouth of a bottle comprising a time denoting mechanism having two rotating members, wherein a first rotating member comprises markings denoting a first unit of time and a second rotating member comprises markings denoting a second unit of time. The first unit of time could be a day of a week and the second unit of time could be an hour of a day. Alternatively, the first unit of time could be a day of a month and the second unit of time could be a month of a year.

In another embodiment, the present specification is directed toward a kit for enabling a nursing mother to manage the extraction, storage, and use of breast milk, comprising a plurality of milk storage containers, each comprising a plastic body with a mechanism for denoting a time in which milk was placed in the storage container for storage and an educational DVD describing appropriate methods for extracting, storing, and using breast milk. The kit may further comprise at least one of bags for holding milk storage containers, burping cloths, bibs, cold packs, and heat packs. In another embodiment, the kit for enabling a nursing mother to manage the extraction, storage, and use of breast milk comprises a plurality of milk storage containers, each comprising a plastic body and a lid wherein said lid further comprises a mechanism for denoting a time in which milk was placed in the storage container for storage and an educational DVD describing appropriate methods for extracting, storing, and using breast milk.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION OF THE INVENTION

The present specification discloses a method and system for storing breast milk and providing information regarding the date of storage. The system provides a convenient mechanism for labeling milk storage containers for date information.

Additionally, the present specification discloses a method and system for storing food and/or other perishables and providing information regarding the date of storage. The system provides a convenient mechanism for labeling food and/or perishable storage containers for date information.

The present specification will be described with reference to aforementioned drawings. One of ordinary skill in the art would appreciate that the applications described herein are examples of how the broader concept can be applied. For example, it should be noted herein that while the present specification is described with respect to breast milk storage, the containers of the present invention can be employed to store any food or other perishable item, including but not limited to medicines, lotions, creams, tonics and other cosmetic and/or herbal preparations.

Figure 1:
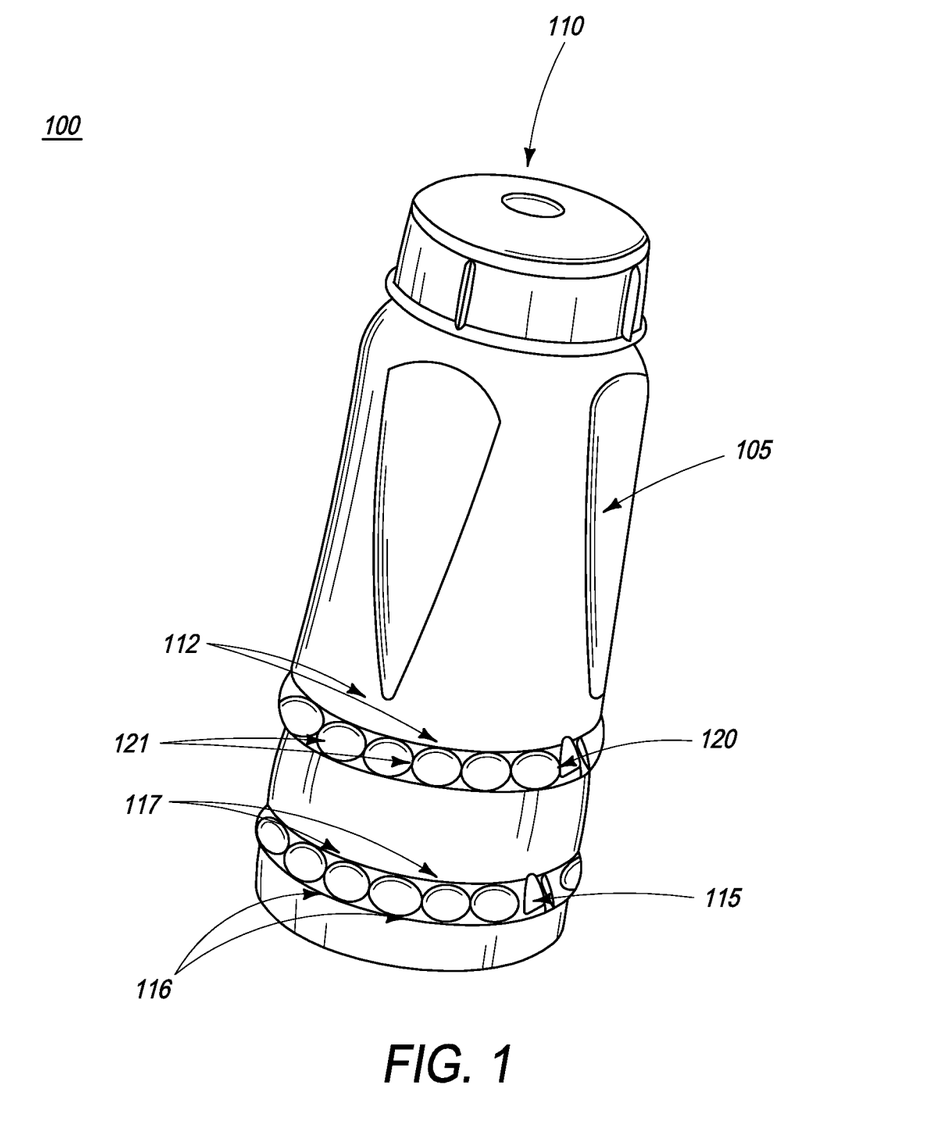
FIG. 1 is illustrates one embodiment of the present invention.

FIG. 1 illustrates one embodiment of the present invention. Referring to FIG. 1, in one embodiment, the invention comprises a milk storage container 100, similar in size and shape to a baby bottle commonly used for feeding infants or to bottles used to collect breast milk extracted using breast pumps. The present invention extends to milk storage containers compatible with any electronic or manual breast pump, including those pumps manufactured or distributed by Ameda, Avent, Evenflo, Medela, Newborn Essentials, and PureLan. For ease-of-use, the milk storage container 100 is manufactured using freezer-compatible and microwave-safe plastic material.

Figure 2:
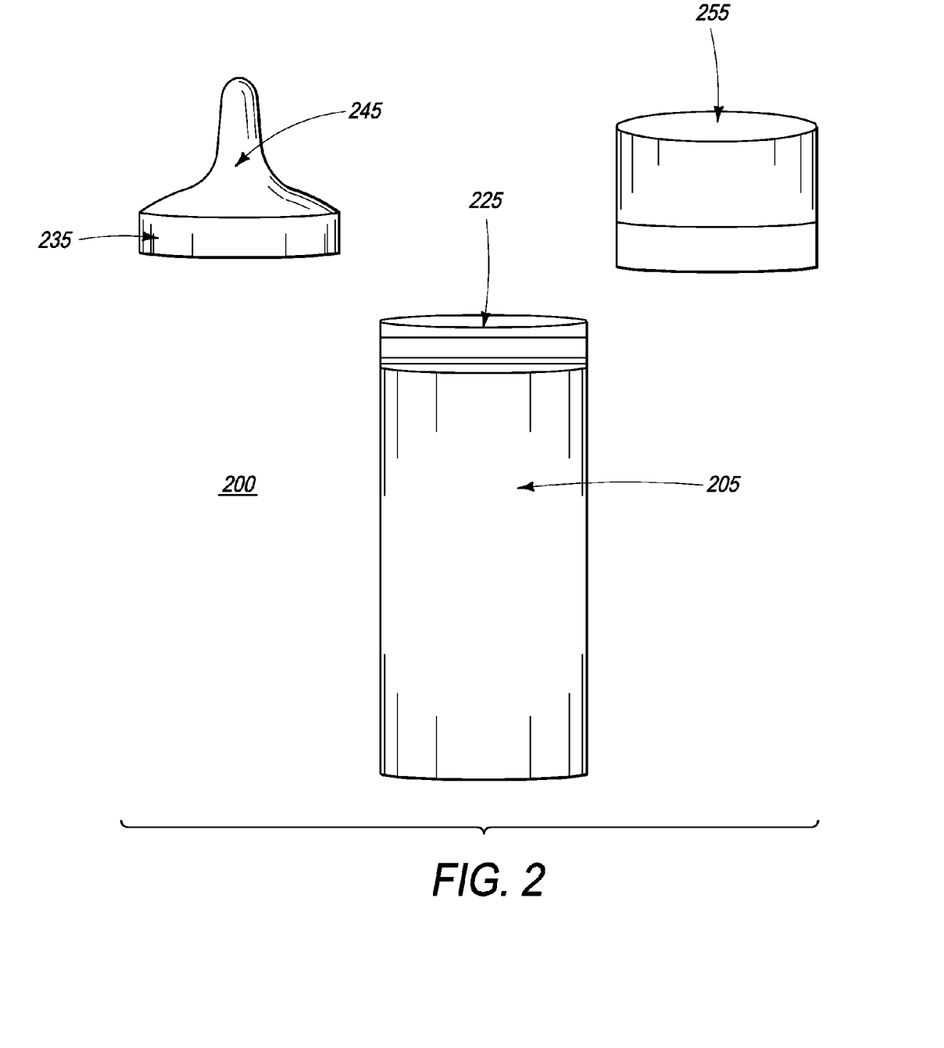
FIG. 2 illustrates the compatibility of a milk storage container with nipples and breast pump connectors.

The milk storage container comprises a body 105 and a mouth which is covered by a lid 110. The lid 110 can be any type of lid known to persons of ordinary skill in the art, including a screw-top lid and a snap on lid. Preferably, the mouth is compatible with lids used in combination with nipples or connectors to breast pumps. Referring to FIG. 2, a milk storage container 200 comprises a body 205 and a mouth 225 which is compatible with a nipple 245 and nipple lid 235 combination or a connector 255 to a breast pump.

It should be appreciated that the present invention could apply to any type of container, including baby food jars, plastic containers, Tupperware, or any other food container. In particular, jars containing baby food are often partially used.

It would be preferable to keep the remainder of the food in the jar, and not throw away the remainder, but one often loses track of when the jar was opened and whether the remainder is suitable or safe for consumption. The systems, devices, and methods of the present invention allow users to track when a baby food jar or bottle was opened and when it would be no longer suitable for consumption.

Referring back to FIG. 1, the container 100 further comprises a mechanism for denoting time 120, 115 located on its body 105. In one embodiment, the mechanism for denoting time comprises two rings 120 and 115 capable of being rotated. With respect to the first ring 120, it comprises an inner surface and outer surface with each of said surfaces comprising raised portions 121 relative to the rest of the ring structure. The raised portions 121 on the outer surface are preferably divided by spaces of equal distances. In one embodiment, the outer surface of the ring 120 is divided into 30 equal spaces. Above each raised portion is a day of a month, numbered from 1 to 31, 122 printed on the container body 105. To denote a specific day, it is preferred that at least one of the raised portions 121 has a unique demarcation, such as an arrow, line, varied color, or some other marking. One of ordinary skill in the art would appreciate that the numeration 122 can be positioned below or above the raised portions 121.

With respect to the second ring 115, it comprises an inner surface and outer surface with each of said surfaces comprising raised portions 116 relative to the rest of the ring structure. The raised portions 116 on the outer surface are preferably divided by spaces of equal distances. In one embodiment, the outer surface of the ring 115 is divided into 11 equal spaces. Above each raised portion is a month of the year, numbered from 1 to 12 or labeled with an abbreviated name of a month (e.g. Jan., Feb., Mar., Apr., May, Jun., Jul., Aug., Sep., Oct., Nov., and Dec.) 117 printed on the container body 105. To denote a specific month, it is preferred that at least one of the raised portions 116 has a unique demarcation, such as an arrow, line, varied color, or some other marking. One of ordinary skill in the art would appreciate that the numeration 117 can be positioned below or above the raised portions 116.

One of ordinary skill in the art would further appreciate that other embodiments employing ring structures can be employed and still remain within the scope of the present invention. Such embodiments include, but are not limited to:
- Providing multiple rings with a first ring enumerated using hours of a day, a second ring enumerated using days of a month, and a third ring enumerated using months of a year;
- Providing multiple rings with a first ring enumerated using a portion of the hours of a day, with a second ring enumerated using the rest of the hours of a day, a third ring enumerated using a portion of the days of a month, a fourth ring enumerated using the rest of the days of a month, a fifth ring enumerated using a portion of the months of a year, and a sixth ring enumerated using the rest of the months of a year;
- Having the rings positioned at any location on the body 105; and
- Providing numeration in the form of alphanumeric characters or symbols, skipping numeration (e.g., labeling every other day, month or hour), marking skipped months, days, or hours by symbols.

Figure 3:
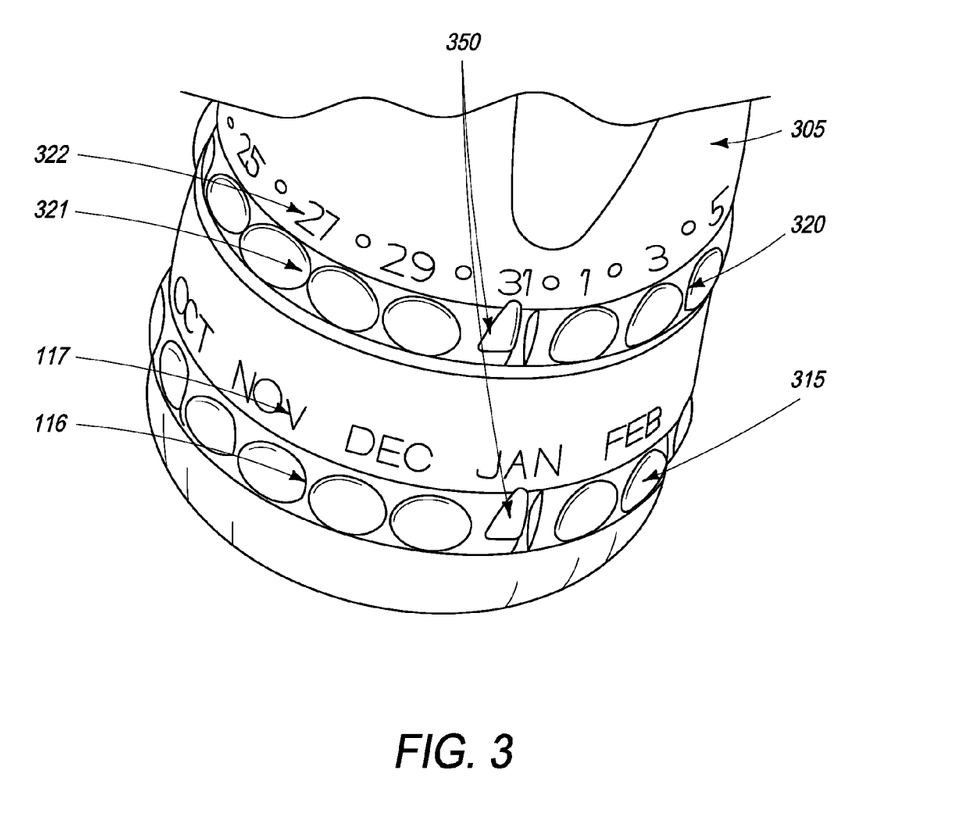
FIG. 3 depicts one mechanism for denoting a time integrated into one embodiment of the present invention.

In a preferred embodiment, as shown in FIG. 3, each of the two rotatable rings 320, 315 comprises an arrow shaped marker 350 such that when a ring is rotated, the marker 350 can be positioned to point towards the desired day of the month and the desired month of the year. This allows the container to be labeled for a specific date. First ring 320 has been rotated using raised portions 321 to position the arrow marker 350 to point towards numeration 322 labeled "31", while the second ring 315 has been rotated using raised portions 116 to position the arrow marker 350 to point towards numeration 117 labeled "January", thereby marking the feeding container with the date January 31$^{st}$.

Figure 4:
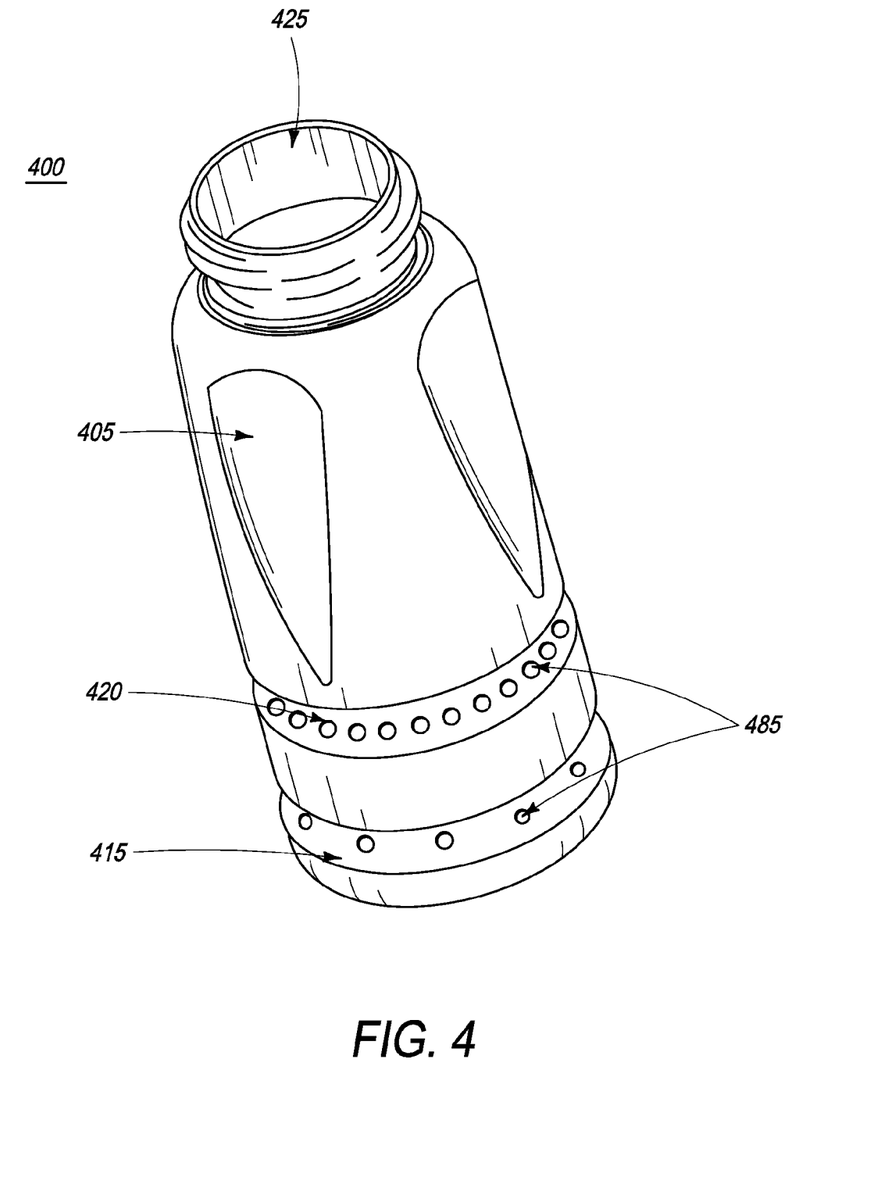
FIG. 4 illustrates a structural element of a time designation mechanism integrated into one embodiment of the present invention.

FIG. 4 illustrates the details of integrating the above described labeling mechanism with the storage container of the present invention. As can be seen from FIG. 4, milk storage container 400 comprises a body 405 and lid 425. The body 405 comprises two ring indentations 420 and 415 which are compatible with the above described circular rings. Grooves 485 are embedded into the circular indentations which mate against the raised portions of the inner surfaces of the rings. Preferably, the grooves 485 are equally spaced and correspondingly match to a day of the month in the upper indentation 420 and to a month of the year in the lower indentation 415. These holes or grooves serve the purpose of accurately locking the arrow shaped markers into the desired position, when a user rotates the rings to mark a date on the container. The inner surface of the rings comprise small protrusions or raised portions that fit into the holes corresponding to the desired day of the month and month of the year, and fix the arrow markers in place.

Although the aforementioned embodiment describes the use of a labeling mechanism on the rear end of the container, one of ordinary skill in the art would appreciate that such a mechanism may be provided anywhere on the container. Additionally, the labeling mechanism may not be limited to marking dates, but may also include a mechanism for tracking time. Further, the method of labeling may not just comprise making use of rotatable rings, but may be implemented in a plurality of different ways.

Figure 5A:
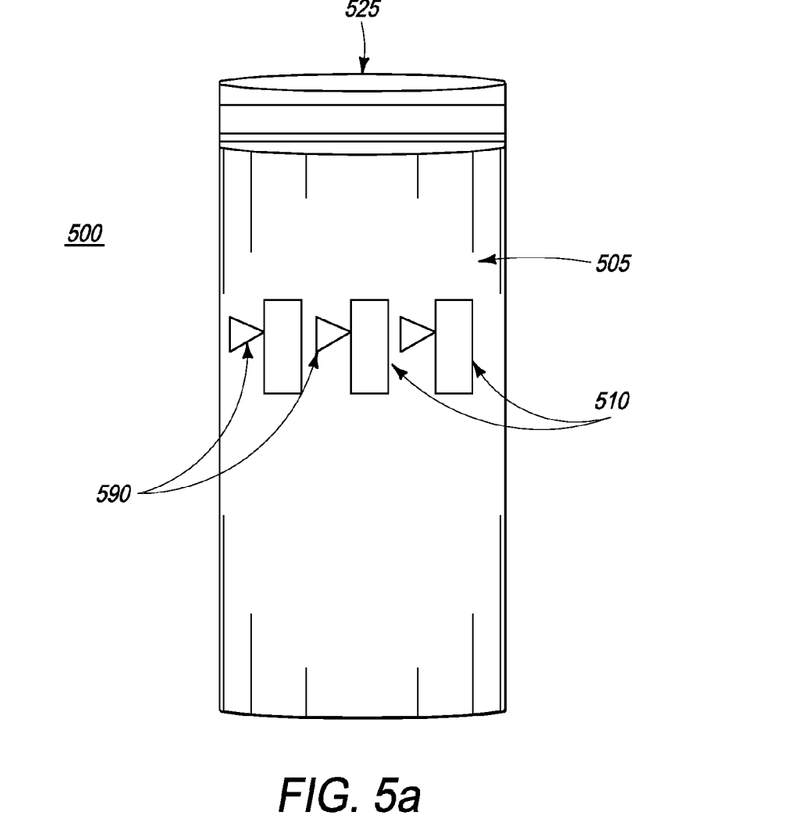
FIG. 5a illustrates another mechanism for denoting a time integrated into the body of an embodiment of the present invention.

In one embodiment, the time denoting mechanism may comprise a vertical or a horizontal dial that can be used to set hour, day, or month when the container was filled with expressed milk. Referring to FIG. 5a, a milk storage container 500 comprises a body 505, a mouth 525 and a plurality of dials 510. Each dial 510 includes a plurality of time designations, such as hours (from 1 to 24 or 1 am to noon and 1 pm to midnight), days (1 to 31 or days of the week), and months (Jan., Feb., Mar., Apr., May, Jun., Jul., Aug., Sep., Oct., Nov., and Dec.). In use, a specific time designation may be denoted by aligning an arrow, printed on the container, 590 with the appropriate, day, month, or hour designation on the horizontal or vertical dial 510.

Figure 5B:
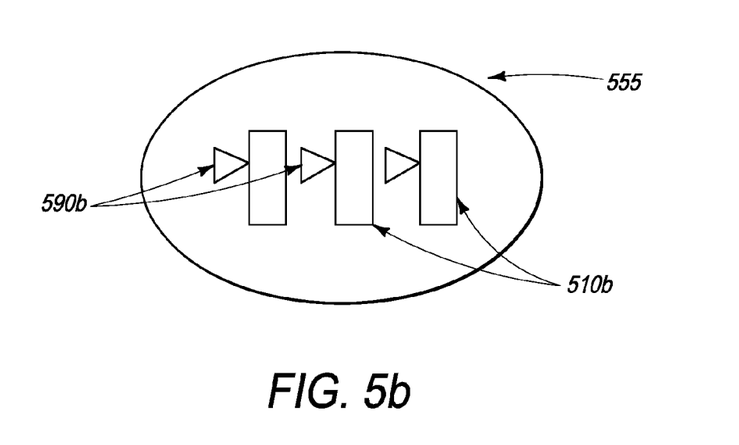
FIG. 5b illustrates another mechanism for denoting a time integrated into the lid of an embodiment of the present invention.

Dials 510 may be incorporated either on the body of the container or on the cap or lid, as shown in FIG. 5b. A lid 555 comprises a plurality of dials 510b wherein each dial includes a plurality of time designations, such as hours (from 1 to 24 or 1 am to noon and 1 pm to midnight), days (1 to 31 or days of the week), and months (Jan., Feb., Mar., Apr., May, Jun., Jul., Aug., Sep., Oct., Nov., and Dec.). In use, a specific time designation may be denoted by aligning an arrow, printed on the lid, 590b with the appropriate, day, month, or hour designation on the horizontal or vertical dial 510b. Optionally, dials may be provided on both the body and the lid, wherein a first set of dials set a first time designation (i.e. hour or day) and the second set of dials set a second time designation (i.e. month).

In another embodiment, day, month and time information may be specified by employing push buttons, which may be provided either on the cap or on the bottle. In yet another embodiment, the time designation mechanism comprises slots on the container body and/or the cap, into which small plastic cards printed with days of the month and months of the year can be inserted. In an exemplary implementation, the container body has two slots for inserting plastic cards. A first set of cards is provided, printed with numerals ranging from 1 to 31 to signify days of the month, along with a second set of cards on which the months of a year, January to December, are printed. A user can insert a card with appropriate numeral from the first set into the slot provided for the same, to signify the day of the month, and another card from the second set into the second slot for the month of the year. Spare sets of cards may be supplied along with the milk storage container, to allow a user to set the date and optionally, the time, even if cards from the primary set are lost or misplaced.

In another embodiment, the time designation mechanism comprises a set of counters, such as those employed in numerical locks on suitcases, to set date and month of storing milk in the container. As with other embodiments, the counters may be integrated either on the container body or on the cap.

In another embodiment of the present invention, the time designation mechanism for the milk container is provided on the lid or cap of the container, instead of on the body of container.

In yet another embodiment, the time designation mechanism comprises removable rings with date markings that can be positioned anywhere around the container or on the cap.

In yet another embodiment, the present invention comprises a set of milk storage containers, with a plurality of caps or bottle tops in different colors, wherein each color is associated with a particular day of the week, such as Monday, Tuesday, Wednesday, Thursday, Friday, Saturday, or Sunday. Such a set is especially useful when milk is to be stored in a refrigerator for several days, such as a week. Thus, mothers who are working professionals or those who may be traveling may express their milk and store in bottles with different colored tops, with each colored top corresponding to a different day of the week. In addition to using different colors to distinguish bottle tops for different days, the names of the days of the week themselves may also be printed on different colored caps.

Figure 6:
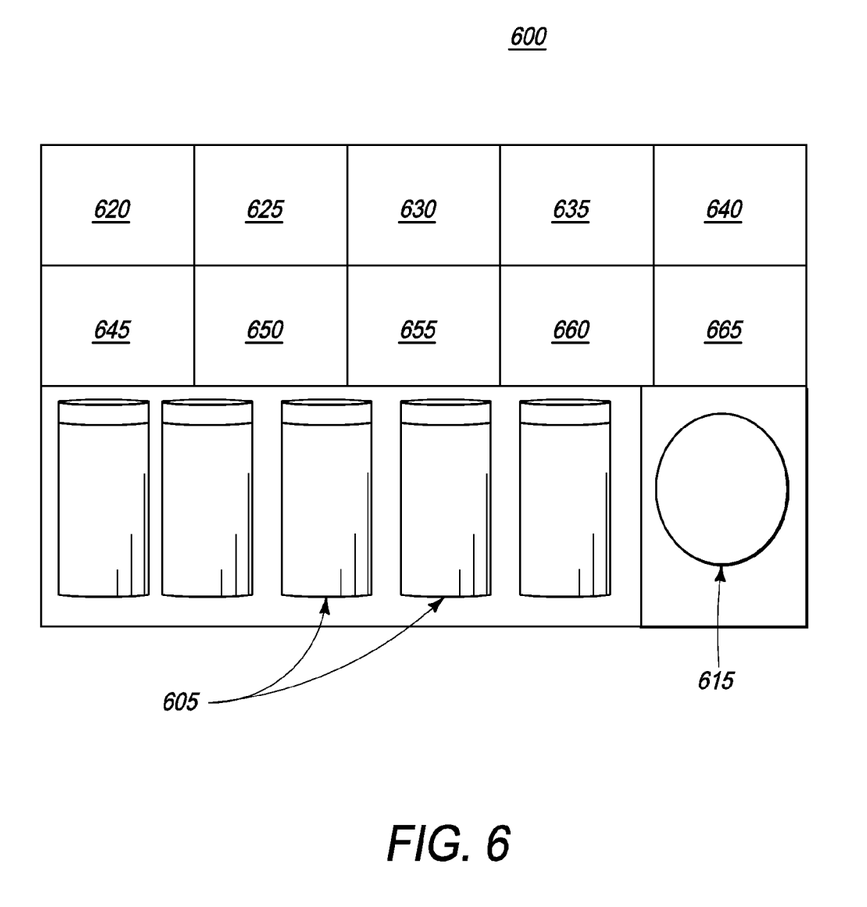
FIG. 6 depicts a kit for the provision of milk container storage products together with other accessories.

Referring to FIG. 6, the present invention is presented as a kit or package 600 comprising milk storage containers 605 with time designation mechanisms [not shown], an educational DVD 615, and a plurality of breast feeding or breast milk storage aids. The educational DVD provides an explanation of at least one of the following topics: how breast feeding can be done, the benefits of breast feeding, how breast milk should be stored, tips on how to best manage breast milk, directions regarding the correct method of breast feeding, and the common problems encountered while breast feeding.

In one embodiment, the package 600 comprising milk storage containers 605 also includes other accessories required for breast feeding. These accessories include, but are not limited to, a set of nipples 620, caps for covering the nipples and keeping them sterile when not in use 625, a specialized brush for cleaning bottles and nipples 630, insulated bottle bags that keep the containers with milk cool or warm 635, burping cloths 640, bags for holding milk storage containers 645, bibs 650, cold packs 655, heat packs 660, and pacifiers 665. The package may also include a tote bag, which is especially useful while traveling for carrying the feeding containers as well as other things a baby requires, such as changes of clothes. The package may also optionally comprise customized freezer packs that fit around the containers. One of ordinary skill in the art would appreciate that each of the aforementioned elements can be provided in different shapes and configurations within the kit and not all of said aforementioned elements need to be included in the kit 600 to fall within the scope of the present invention.

Figure 7A:
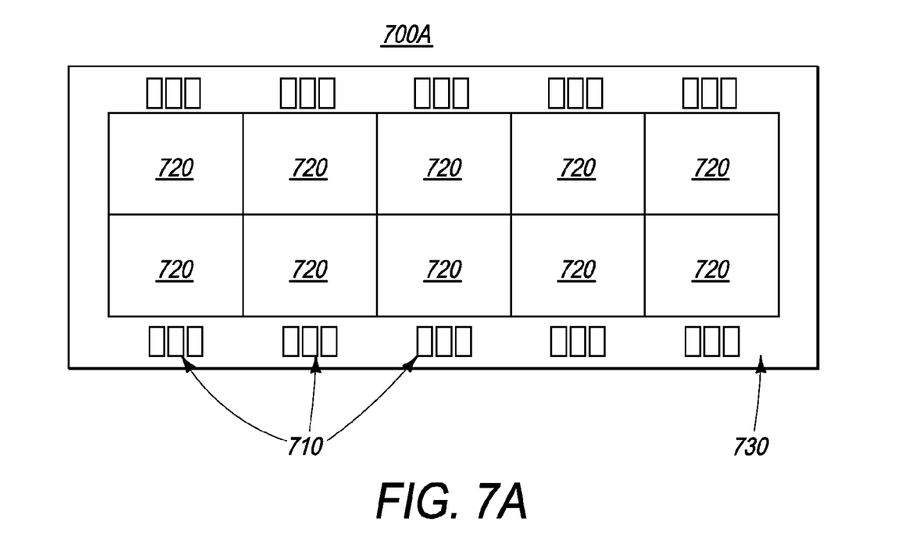
FIG. 7a depicts a milk bottle tray with date indicators incorporated therein.
Figure 7B:
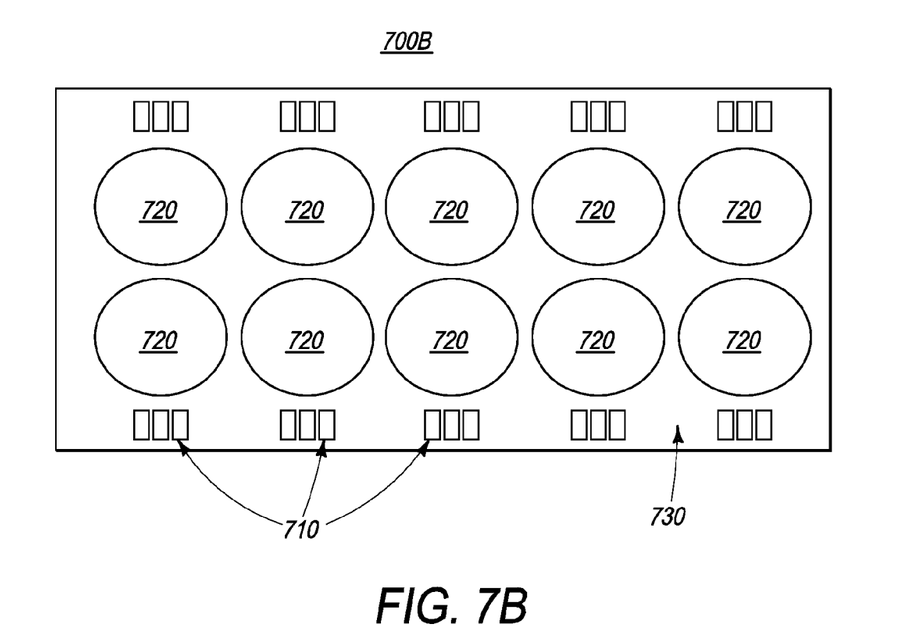
FIG. 7b depicts another embodiment of a milk bottle tray with date indicators incorporated therein.

In another embodiment, a plurality of date indicators or time designators are incorporated into a tray capable of holding a plurality of milk containers and adapted for being used in a freezer or refrigerator. Referring to FIGS. 7a and 7b, a tray 700a, 700b comprises a plurality of voids 720 incorporated into a body 730. The body 730 may comprise any suitable material, such as plastic, aluminum, or stainless steel body. The voids 720 can be square, circular, oval, or any other geometric shape capable of holding a milk bottle or other container. Integrated into the tray 700a, 700b are time designations or date indicators 710 that can be used to indicate the production time or date of the milk placed in the associated void. The time designators or date indicators 710 can comprise a plurality of dials use to designate the hour, day, and/or month the milk in the associated void was generated. The time designators or date indicators 710 can be any form of date representation, including numbered dials, printed labels, or color coded labels. Additionally, each individual void can have its own time designator or date indicator 710 or a plurality of voids can share a single time designator or date indicator 710.

Figure 8:
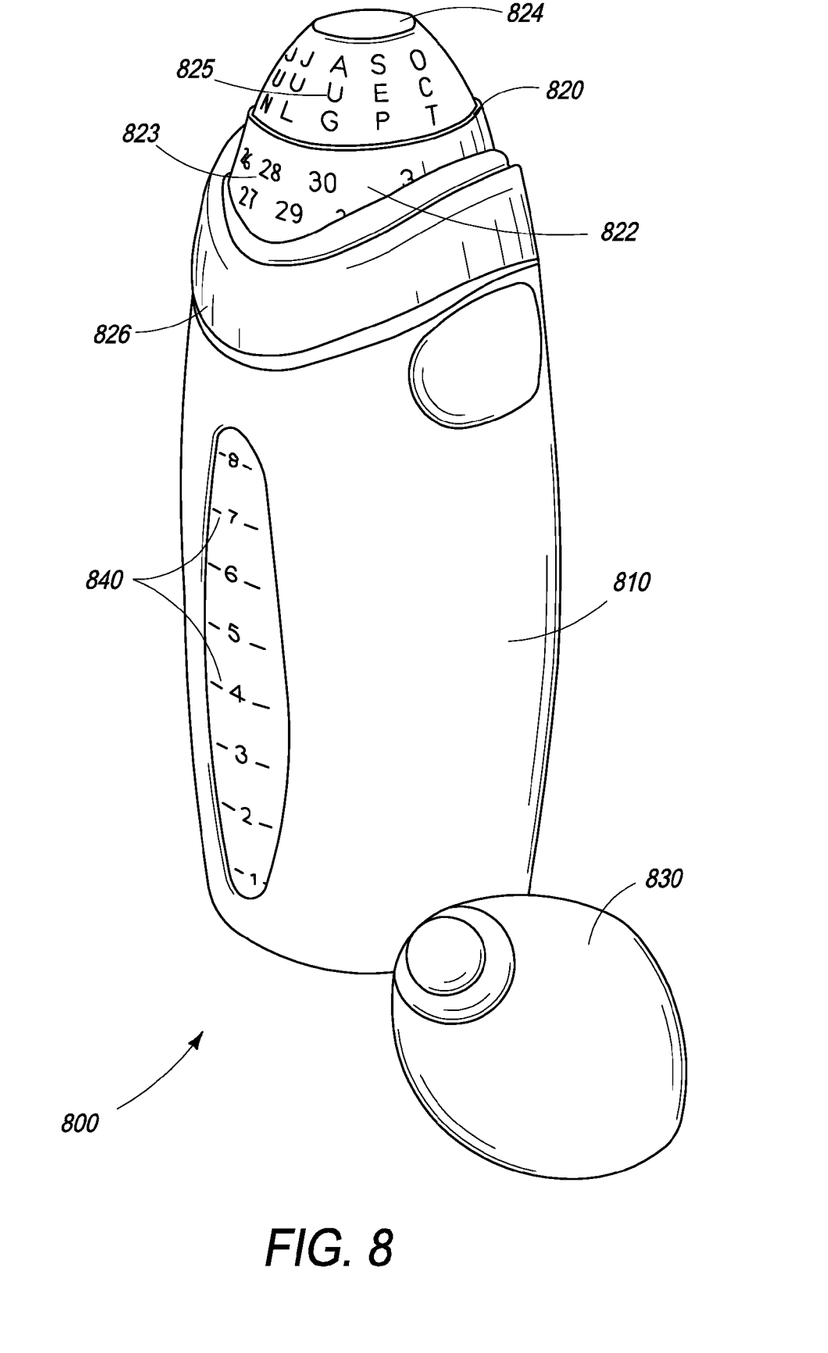
FIG. 8 illustrates another embodiment of a container with a mechanism for denoting a time integrated into the lid of the bottle.

In yet another embodiment, the storage container of the present invention provides another mechanism for denoting a date and time on the lid of the container. Referring to FIG. 8, storage container 800 is shown, having a similar size and shape to a conventional baby bottle commonly used for feeding infants. The container 800 may be used in combination with breast pumps to collect the extracted breast milk, to store the expressed milk with date markings, or to feed infants by using a nipple on the mouth of the container.

The milk storage container 800 comprises a body 810, a mouth (not visibly shown) covered by a lid 820, and a cap 830. Body 810, lid 820 and cap 830 of milk storage container 800 are preferably manufactured using freezer-compatible and microwave-safe plastic material. In one embodiment, the cap 830 is preferably manufactured using semi-transparent plastic material. In one embodiment, at least one portion of the surface of cap 830 comprises an indented portion or groove (not shown) having greater transparency than the rest of the cap. This allows for a "viewing window" so that the date indication can be easily viewed without opening the bottle.

Lid 820 may be any type of lid such as, but not limited to, a screw-top lid or a snap-on lid. The mouth of the container is preferably compatible with conventional lids used in combination with nipples or connectors to breast pumps. Lid 820 of the storage container further comprises substantially circular or elliptical members 822 and 824, fitted onto substantially elliptical base 826. Substantially elliptical base 826 is slightly concave in one plane so that it has a v-shaped front surface from a planar front view. The elliptical members 822 and 824 are capable of being rotated and serve as a mechanism for denoting the date of storage. In one embodiment, the days of the month 823 (numbered from 1 to 31) are printed at equal distances, or denoted by other markings, on the surface of first member 822. In one embodiment, the months of the year 825 are printed at equal distances, or denoted by other markings, on the surface of second member 824. In one embodiment, the months of the year 825 are numbered from 1 to 12. In another embodiment, the months of the year 825 are labeled with an abbreviated name of a month (e.g. Jan., Feb., Mar., Apr., May, Jun., Jul., Aug., Sep., Oct., Nov., and Dec.). In one embodiment, the hours of the day (numbered from 1 to 24) are printed at equal distances, or denoted by other markings, on the surface of at least one member. In another embodiment, the days of the week (labeled M, T, W, Th, F, Sa, Su) are printed at equal distances, or denoted by other markings, on the surface of at least one member.

The body 810 of the container is inscribed with markings 840 to indicate the volume of food contained therein. In one embodiment, as shown in FIG. 8, the volume is denoted in ounces (oz), from iterations of 1 ounce to 8 ounces. It may, however, be appreciated that the volume markings may be denoted in milliliters (ml) or in cubic centimeters (cc), apart from, or in addition to ounces. Further, any number of markings may be inscribed, depending upon the capacity of the container.

Figure 9:
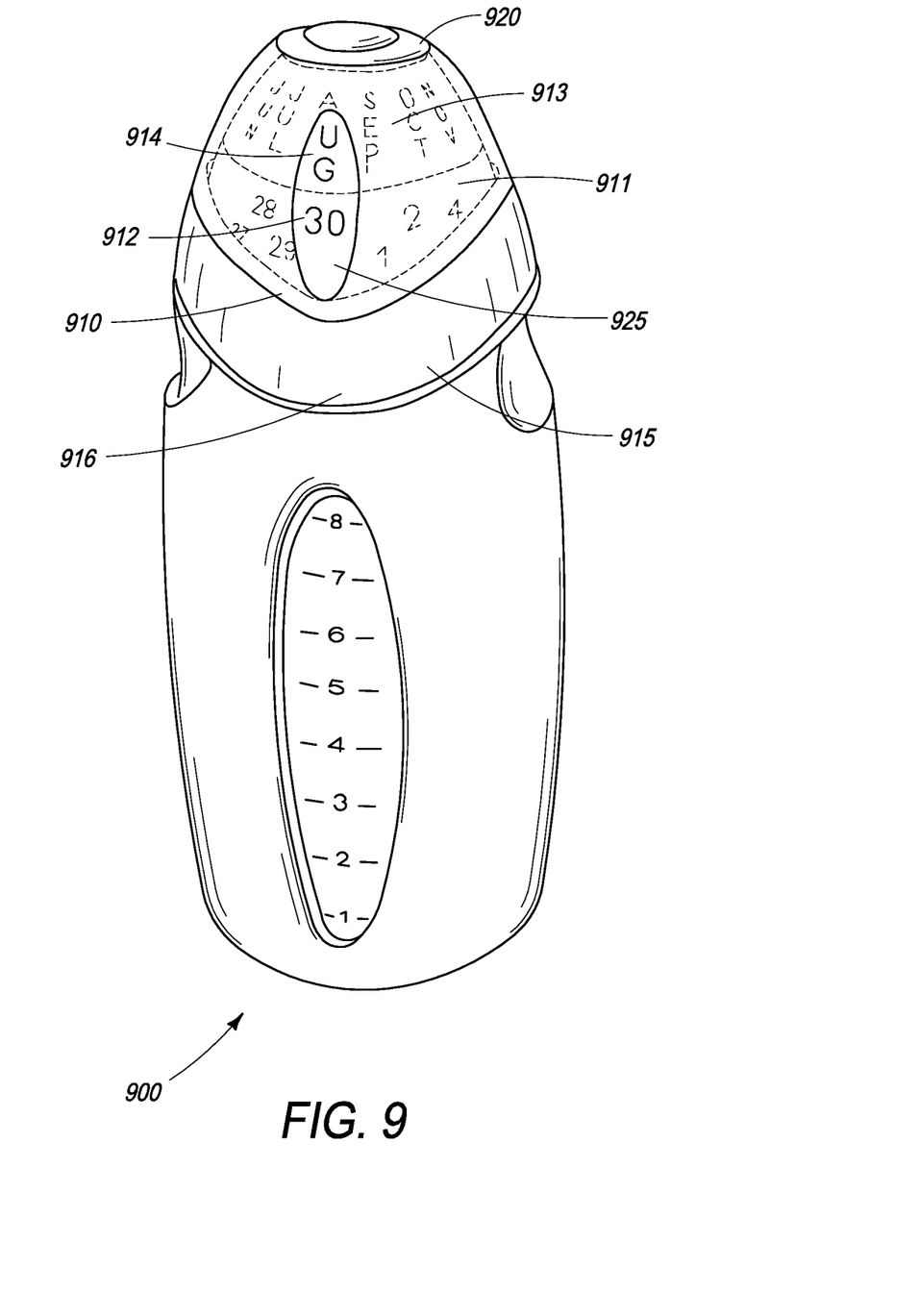
FIG. 9 depicts a method of marking time according to one embodiment of the present invention.

FIG. 9 depicts a method of marking time according to one embodiment of the present invention, shown in FIG. 8. Referring now to FIG. 9, storage container 900 comprises lid 910, which is placed on container 900 after it is filled. After storage container 900 is filled, first member 911, which preferably has the days of the month inscribed on it as described in FIG. 8, is rotated such that the number representing the desired day of the month is aligned with the center or vertex 916 of the substantially elliptical base 915 having a v-shaped front planar surface. In the same manner, the second member 913 may be rotated such that the desired month of the year is aligned with the vertex 916 of the v-shaped surface on elliptical base 915. Thus, as shown in FIG. 9, the first member 911 has been rotated to indicate the date position 912 (labeled "30"), while the second member 913 has been rotated to indicate the month position 914 (labeled "August") along the vertex 916 of the front planar surface of base 915, thereby marking the feeding container with the date August 30$^{th}$. It should be appreciated that any units of time could be used (hours, days, weeks, months, years, minutes, seconds) and that the desired time unit is denoted by rotating the rings or members in a manner that aligns the desired time unit with a marker, icon, or other indicator.

Subsequently, cap 920 is placed on the lip or top edge (not shown) of base 915 of the lid, over circular members 911 and 913. Further, cap 920 is designed such that when placed on the base over the circular members, the groove 925 also aligns along the vertex 916 of the v-shaped base 915.

As mentioned in FIG. 8, the surface of the cap 920 comprises an indented portion or groove 925, which has a greater transparency compared to the rest of the cap. The transparent indented portion or groove 925 serves as a "viewing window" for the time and date indication for easy viewing so that the user does not have to remove the cap.

It should be appreciated that the date or time marking mechanism of the present invention may be applied not only to bottles used with breast pumps or for feeding infants, but to any type of container and for any type of food, such as plastic containers, Tupperware, metallic containers or any other food container. The time tracking mechanism of the present invention is particularly useful to storage of partially consumed food. In a typical household, it often happens that prepared food is not completely consumed, and the leftover food is stored in the refrigerator. At times people also deliberately prepare extra food in advance, and store it for later consumption. However, one often loses track of when the food was prepared and stored and whether the remainder is suitable for consumption. The systems, devices, and methods of the present invention allow users to conveniently mark the date on containers and track when food was stored in a container and when it would be no longer suitable for consumption. Further, the time tracking mechanism of the present invention may be implemented anywhere on the body or on the lid of a food container.

It should also be appreciated that the time denoting mechanisms, if integrated into a lid as shown above, can be used with existing storage containers. For example, while the lids shown in FIGS. 8 and 9 are preferably used with the bottle as shown, they can be adapted for use with existing bottles or other storage containers. Therefore, the present invention includes novel lids having mechanisms to denote time and date of storage integrated therein and adaptable to be used with bottles or other containers of any size or shape.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention is not to be limited to the details given herein.

I claim:

1. A kit having a plurality of compartments wherein at least one compartment has a lid comprising a base and a top, wherein said lid comprises:
    a plurality of threads adapted to screw onto a bottle, wherein said threads are proximate to the base of the lid;
    an exterior curved surface defining a first circumference and a second circumference, wherein said first circumference is between said second circumference and said base, wherein said second circumference is between said first circumference and said top, and wherein said first circumference is larger than said second circumference;
    a first rotating member on the exterior surface and extending around said first circumference, wherein said first rotating member has a first thickness and is sloped along said first thickness; and
    a second rotating member on the exterior surface and extending around said second circumference, wherein said second rotating member has a second thickness and is sloped along said second thickness and wherein said second thickness is greater than said first thickness.

2. The kit of claim 1 further comprising a transparent cap, wherein the cap is configured to fit over said first rotating member and said second rotating member and wherein said cap further comprises an indented portion to define a viewing window for viewing a portion of said first rotating member and a portion of said second rotating member.

3. The kit of claim 2 wherein the viewing window serves to align a month marking on said first rotating member with a day marking on said second rotating member.

4. The kit of claim 1 further comprising at least one bottle having a top surface, adapted to mate with the plurality of threads of the lid, positioned in at least one of said plurality of compartments.

5. The kit of claim 1 further comprising at least one nipple positioned in at least one of said plurality of compartments.

6. The kit of claim 1 further comprising at least one bottle cleaning brush positioned in at least one of said plurality of compartments.

7. The kit of claim 1 further comprising at least one of an insulated bottle bag, burping cloth, bib, cold pack, heat pack, or pacifier positioned in one or more of said plurality of compartments.

8. The kit of claim 1 wherein said first rotating member comprises markings denoting a plurality of months.

9. The kit of claim 1 wherein said first rotating member is elliptically shaped.

10. The kit of claim 1 wherein said second rotating member comprises markings denoting a plurality of days.

11. The kit of claim 1 wherein said second rotating member is elliptically shaped.

12. The kit of claim 1 wherein said first rotating member comprises markings denoting a first unit of time, wherein said second rotating member comprises markings denoting a second unit of time, and wherein said first unit of time is different than said second unit of time.

13. The kit of claim 12 further comprising a transparent cap, wherein the cap is configured to fit over at least one of said first rotating member or said second rotating member.

14. The kit of claim 13 wherein said cap further comprises an indented portion to define a viewing window for viewing a portion of said first rotating member and a portion of said second rotating member.

15. The kit of claim 14 wherein the viewing window serves to align a month marking on said first rotating member with a day marking on said second rotating member.

16. The kit of claim 12 further comprising at least one bottle having a top surface, adapted to mate with the plurality of threads of the lid, positioned in at least one of said plurality of compartments.

17. The kit of claim 16 further comprising at least one bottle cleaning brush positioned in at least one of said plurality of compartments.

18. The kit of claim 12 further comprising at least one of a nipple, an insulated bottle bag, a burping cloth, a bib, a cold pack, a heat pack, or a pacifier positioned in one or more of said plurality of compartments.

\* \* \* \* \*